(12) United States Patent
Bavel (10) Patent No.: US 9,088,220 B2
(45) Date of Patent: Jul. 21, 2015

(54) COMBINED LOW POWER ISOLATED POWER SUPPLY WITH ISOLATED DATA TRANSFER

(71) Applicant: Kyle Van Bavel, Oakville, CA (US)

(72) Inventor: Kyle Van Bavel, Oakville, CA (US)

(73) Assignee: Cooper Technologies Company, Houston, TX (US)

( * ) Notice: Subject to any disclaimer, the term of this patent is extended or adjusted under 35 U.S.C. 154(b) by 315 days.

(21) Appl. No.: 13/787,317

(22) Filed: Mar. 6, 2013

(65) Prior Publication Data

US 2014/0036544 A1 Feb. 6, 2014

Related U.S. Application Data

(60) Provisional application No. 61/679,147, filed on Aug. 3, 2012.

(51) Int. Cl.
*H02M 3/335* (2006.01)
*H02M 3/337* (2006.01)

(52) U.S. Cl.
CPC ........ *H02M 3/33507* (2013.01); *H02M 3/3372* (2013.01)

(58) Field of Classification Search
CPC ............ H02M 3/3372; H02M 3/3378; H02M 3/33569; H02M 3/33507; H02M 3/33523; H02M 7/537; Y02B 70/1433
USPC .................... 363/16, 21.1, 24–26, 95, 97, 131
See application file for complete search history.

(56) References Cited

U.S. PATENT DOCUMENTS

| 4,777,382 | A * | 10/1988 | Reingold | 307/106 |
|---|---|---|---|---|
| 2004/0012419 | A1* | 1/2004 | Kim et al. | 327/143 |
| 2005/0030777 | A1* | 2/2005 | Dogome et al. | 363/125 |
| 2006/0239042 | A1* | 10/2006 | Fukumoto | 363/21.09 |
| 2008/0192509 | A1 | 8/2008 | Dhuyvetter et al. | |
| 2009/0001818 | A1* | 1/2009 | Iisaka et al. | 307/104 |

(Continued)

FOREIGN PATENT DOCUMENTS

| EP | 1990904 A2 | 12/2008 |
|---|---|---|
| RU | 99254 | 11/2010 |
| RU | 2418355 | 5/2011 |

OTHER PUBLICATIONS

International Search Report for PCT/US2013/053475. Mailing Date, Nov. 28, 2013.

(Continued)

*Primary Examiner* — Adolf Berhane
(74) *Attorney, Agent, or Firm* — King & Spalding LLP (57) ABSTRACT

An apparatus for generating an isolated power supply voltage and an isolated data signal includes a first pulse generation circuit configured to generate a first pulse signal and a second pulse generation circuit configured to generate a second pulse signal based on an input pulse width modulation (PWM) signal. A transformer circuit including a transformer is coupled to the first pulse generation circuit and to the second pulse generation circuit. The transformer is configured to generate an output pulse signal based on the first pulse signal and the second pulse signal. An isolated power supply circuit is coupled to the transformer circuit and is configured to generate an isolated power supply voltage based on the output pulse signal. A latch circuit is coupled to the transformer circuit and is configured to generate an isolated PWM signal based on the output pulse signal.

20 Claims, 5 Drawing Sheets

(56) References Cited

U.S. PATENT DOCUMENTS

| | | | |
|---|---|---|---|
| 2009/0121767 A1* | 5/2009 | Tsuchida et al. | 327/295 |
| 2009/0212759 A1 | 8/2009 | Melanson | |
| 2009/0231895 A1* | 9/2009 | Hu | 363/127 |
| 2010/0181951 A1* | 7/2010 | Noie et al. | 318/400.11 |
| 2010/0264727 A1 | 10/2010 | Riedel et al. | |
| 2011/0309783 A1* | 12/2011 | Yano | 318/696 |
| 2012/0256637 A1* | 10/2012 | Juhlin | 324/523 |

OTHER PUBLICATIONS

Analog Devices; ADuM5200/ADuM5201/ADuM5202; Data Sheet; May 2012.

Texas Instruments; Fully-Differential Isolation Amplifier; AMC1200, AMC1200B; Data Sheet; Aug. 2012.

* cited by examiner

COMBINED LOW POWER ISOLATED POWER SUPPLY WITH ISOLATED DATA TRANSFER

RELATED APPLICATIONS

The present application claims priority to U.S. Provisional Patent Application No. 61/679,147, filed Aug. 3, 2012, and titled "Combined Low Power Isolated Power Supply With Isolated Data Transfer," the entire content of which is incorporated herein by reference.

TECHNICAL FIELD

The present disclosure relates generally to power supplies and signal transfer, in particular to a combined system that provides an isolated power supply voltage along with an isolated data signal.

BACKGROUND

An isolated power supply with an isolated data transfer circuit may be used in various applications. In some applications, a standard optocoupler may be used to provide an isolated signal. However, power consumption of an optocoupler is relatively too high for some applications when operating to provide an isolated signal. Addition of circuitry to an optocoupler to also provide an isolated power supply results in a relatively large-form-factor, expensive device that consumes too much power for many applications.

An isolation amplifier is another device that may be used to provide an isolated analog output. However, isolation amplifiers are generally expensive and consume relatively too much power. In addition, isolation amplifiers generally require an isolated power supply to power the isolated section of the isolated amplifier. Thus, a device that includes an isolation amplifier and an isolated power supply is generally too expensive and consumes too much power for many applications.

Thus, a relatively inexpensive, low power, small form-factor device that includes a combined isolated power supply and a data transfer circuit would provide benefits that may be lacking in other devices.

SUMMARY

In general, the present disclosure relates to a combined system that provides an isolated power supply voltage along with an isolated data signal. In an example embodiment, an apparatus for generating an isolated power supply voltage and an isolated data signal comprises a first pulse generation circuit configured to generate a first pulse signal based on an input pulse width modulation (PWM) signal. The apparatus also includes a second pulse generation circuit configured to generate a second pulse signal based on the input PWM signal. The apparatus further includes a transformer circuit that includes a transformer. The transformer circuit is coupled to the first pulse generation circuit and to the second pulse generation circuit. The transformer is configured to generate an output pulse signal based on the first pulse signal and the second pulse signal. The apparatus also includes an isolated power supply circuit coupled to the transformer circuit and configured to generate an isolated power supply voltage based on the output pulse signal. The apparatus further includes a latch circuit coupled to the transformer circuit, the latch circuit configured to generate an isolated PWM signal based on the output pulse signal.

In another example embodiment, an apparatus for generating an isolated power supply voltage and an isolated data signal includes a first high pass filter circuit configured to generate a first pulse signal based on an input PWM signal. The apparatus also includes a second high pass filter circuit configured to generate a second pulse signal based on the input PWM signal. The apparatus further includes a transformer configured to generate an output pulse signal based on the first pulse signal and the second pulse signal. The apparatus also includes an isolated power supply circuit coupled to the transformer and configured to generate an isolated power supply voltage based on the output pulse signal. The apparatus further includes a latch circuit coupled to the transformer and configured to generate an isolated PWM signal based on the output pulse signal.

In another example embodiment, a method of generating an isolated power supply voltage and an isolated data signal includes generating a first pulse signal based on an input PWM signal. The method also includes generating a second pulse signal based on the input PWM signal. The method further includes generating, by a transformer, an output pulse signal based on the first pulse signal and the second pulse signal. The method also includes generating an isolated power supply voltage based on the output pulse signal and generating an isolated PWM signal based on the output pulse signal.

These and other aspects, objects, features, and embodiments will be apparent from the following description and the appended claims.

BRIEF DESCRIPTION OF THE DRAWINGS

Reference will now be made to the accompanying drawings, which are not necessarily drawn to scale, and wherein.

The drawings illustrate only example embodiments and are therefore not to be considered limiting in scope. The elements and features shown in the drawings are not necessarily to scale, emphasis instead being placed upon clearly illustrating the principles of the example embodiments. Additionally, certain dimensions or placements may be exaggerated to help visually convey such principles. In the drawings, reference numerals designate like or corresponding, but not necessarily identical, elements.

DETAILED DESCRIPTION OF THE EXAMPLE EMBODIMENTS

In the following paragraphs, particular embodiments will be described in further detail by way of example with reference to the drawings. In the description, well known components, methods, and/or processing techniques are omitted or briefly described. Furthermore, reference to various feature(s) of the embodiments is not to suggest that all embodiments must include the referenced feature(s).

Figure 1:
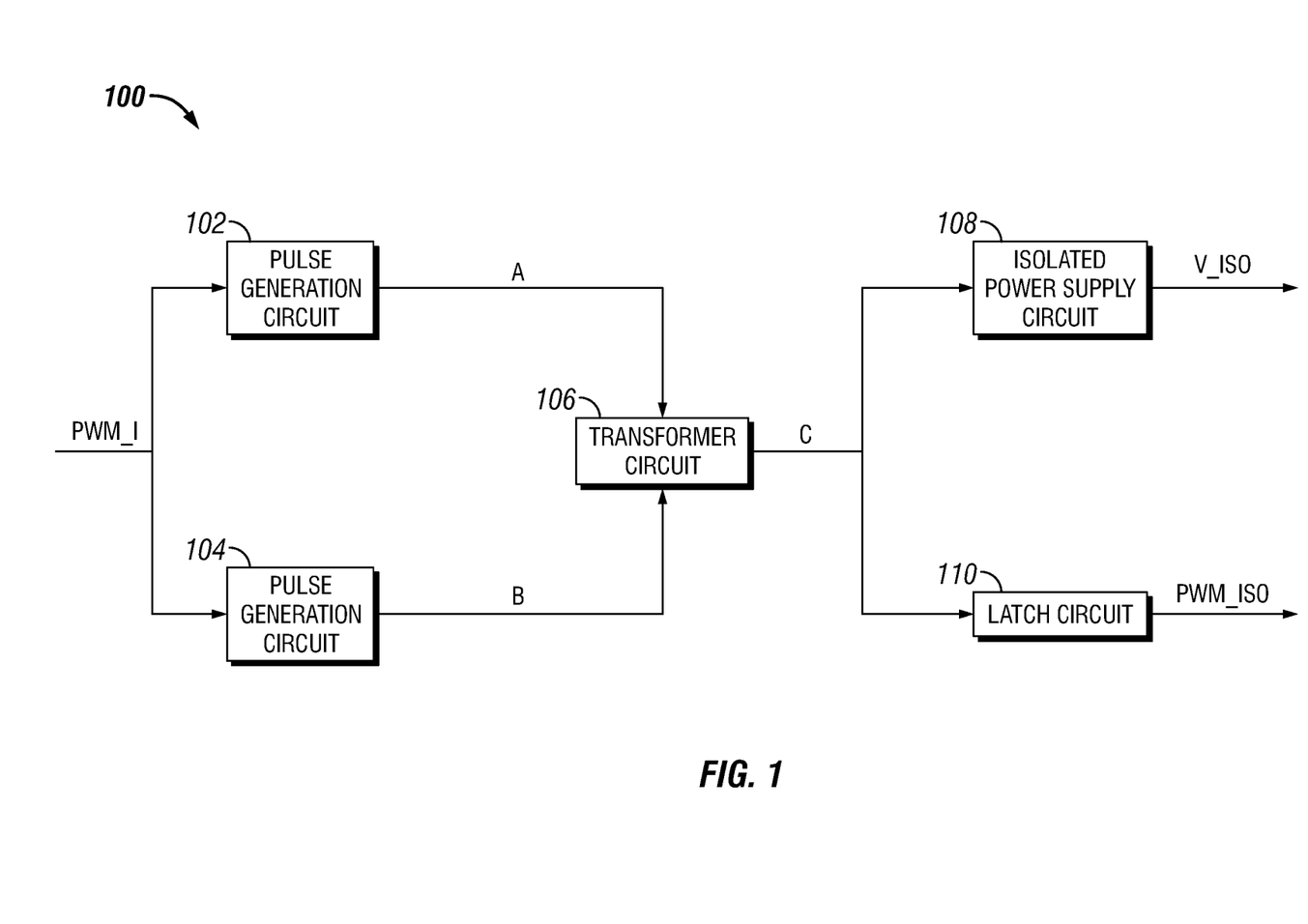
FIG. 1 is a diagram of an example embodiment of a device including an isolated power supply with isolated data transfer circuit.

Turning now to the drawings, example embodiments are described in detail. FIG. 1 presents an example embodiment of a device 100 including an isolated power supply with an isolated data transfer circuit. The device 100 is operable to provide an isolated power supply voltage output and an isolated data signal that are isolated from an input side power supply by a transformer. The device 100 is configured to generate an isolated power supply voltage (V_ISO) and an isolated pulse width modulation (PWM) signal (PWM_ISO) based on an input PWM signal (PWM_I). The isolated PWM signal (PWM_ISO) is an isolated signal representing the data corresponding to the input PWM signal (PWM_I).

In an example embodiment, the device 100 includes a first pulse generation circuit 102, a second pulse generation circuit 104, a transformer circuit 106, an isolated power supply circuit 108, and a latch circuit 110. The first pulse generation circuit 102 and the second pulse generation circuit 104 are coupled to a PWM signal source that provides the input PWM signal (PWM_I). For example, a square wave signal generator may provide the input PWM signal (PWM_I) to the first pulse generation circuit 102 and to the second pulse generation circuit 104.

Figure 3:
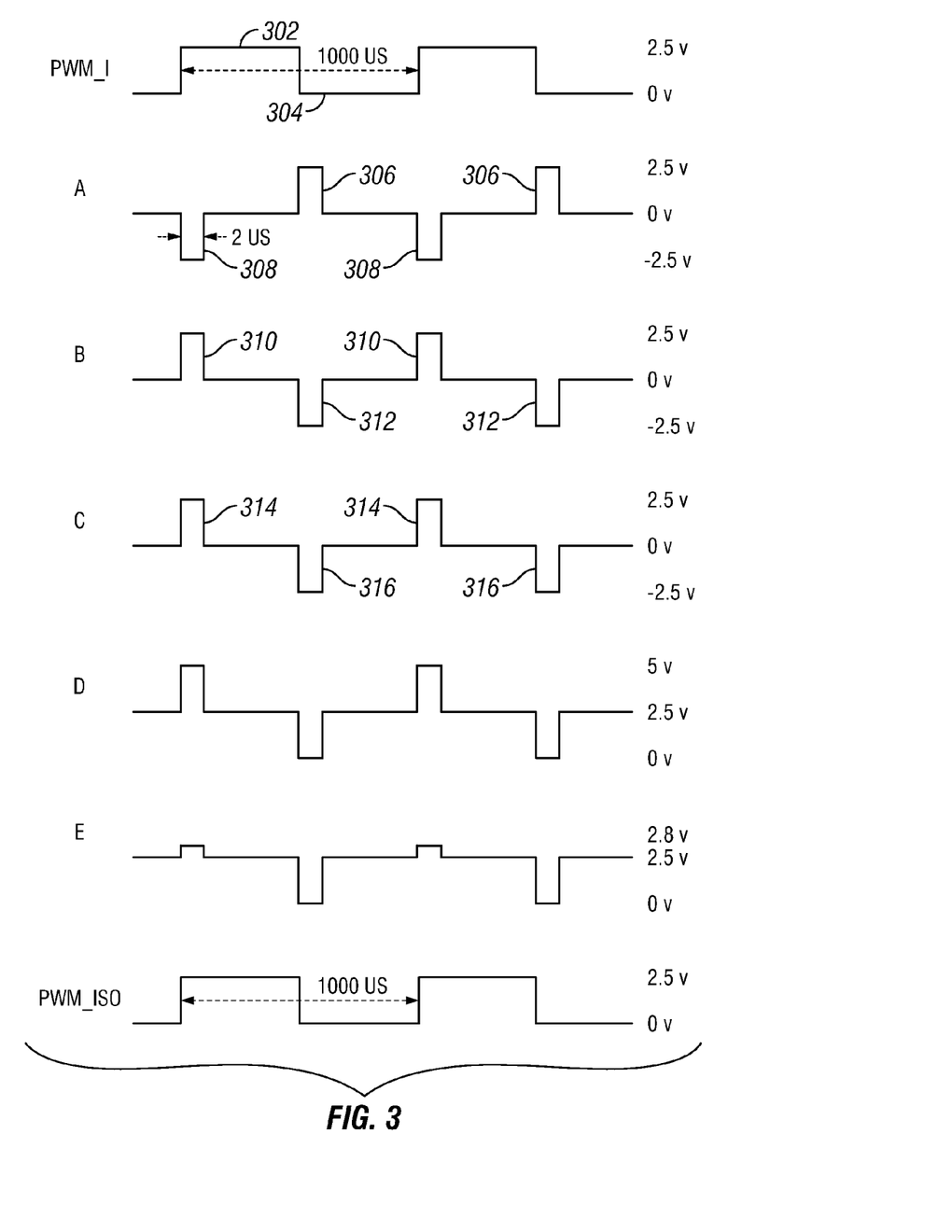
FIG. 3 is a diagram of signal traces corresponding to signals of the device of FIGS. 1, 2A and 2B.

In a particular embodiment, the first pulse generation circuit 102 may generate a first pulse signal (A) based on the input PWM signal (PWM_I). As illustrated in FIG. 3, the first pulse signal (A) has positive and negative pulses. The positive pulses of the first pulse signal (A) have a positive amplitude value relative to a reference voltage level (e.g., 0 volt). The negative pulses of the first pulse signal (A) have a negative amplitude value relative to the reference voltage level. The pulse width of the positive pulses of the first pulse signal (A) and the pulse width of the negative pulses of the first pulse signal (A) are substantially smaller than the period of the input PWM signal (PWM_I). Further, the positive pulses of the first pulse signal (A) and the negative pulses of the first pulse signal (A) are narrower than both the high pulses and the low pulses of the input PWM signal (PWM_I). In an example embodiment, the pulse width of the positive pulses of the first pulse signal (A) is approximately equal to the pulse width of the negative pulses of the first pulse signal (A).

In an example embodiment, the second pulse generation circuit 104 may generate a second pulse signal (B) based on the input PWM signal (PWM_I). As illustrated in FIG. 3, the second pulse signal (B) has positive and negative pulses. The positive pulses of the second pulse signal (B) have a positive amplitude value relative to the reference voltage level. The negative pulses of the second pulse signal (B) have a negative amplitude value relative to the reference voltage level. The positive and negative pulses of the second pulse signal (B) have pulse widths that are substantially smaller than the period of the input PWM signal (PWM_I). Further, the positive and negative pulses of the second pulse signal (B) are narrower than both the high pulses and the low pulses of the input PWM signal (PWM_I). In an example embodiment, the pulse width of the positive pulses of the second pulse signal (B) is approximately equal to the pulse width of the negative pulses of the second pulse signal (B). Those skilled in the art would appreciate that the positive pulses as well as the negative pulses may each have a pulse width and amplitude that slightly vary in value from one pulse to another.

In a particular embodiment, the transformer circuit 106 is configured to generate an output pulse signal (C) based on the first pulse signal (A) and the second pulse signal (B). For example, the transformer circuit 106 may include a single pulse transformer or a gate drive transformer. The first pulse signal (A) and the second pulse signal (B) may bias the transformer circuit 106 to generate the output pulse signal (C). As illustrated in FIG. 3, the output pulse signal (C) has positive and negative pulses. The positive pulses of the output pulse signal (C) have a positive amplitude value relative to the reference voltage level. The negative pulses of the output pulse signal (C) have a negative amplitude value relative to the reference voltage level. In an example embodiment, the pulse width of the positive pulses of the output pulse signal (C) is approximately equal to the pulse width of the negative pulses of the output pulse signal (C). Further, the pulse widths of the positive pulses and the negative pulses of the output pulse signal (C) are approximately equal to the pulse widths of the positive and negative pulses of the first pulse signal (A) and the second pulse signal (B).

Because the first pulse signal (A) and the second pulse signal (B) have narrow pulse widths relative to the high pulses of the input PWM signal (PWM_I) and the low pulses of the input PWM signal (PWM_I), biasing the transformer circuit 106 using the first pulse signal (A) and the second pulse signal (B), instead of using the input PWM signal (PWM_I) for direct biasing, may reduce power consumption by the transformer circuit 106. To illustrate, direct use of the input PWM signal (PWM_I) to bias the transformer circuit 106 may prolong and increase magnetization current of the transformer in the transformer circuit 106, which can result in higher average power consumption by the transformer circuit 106.

In an example embodiment, the isolated power supply circuit 108 is configured to generate the isolated power supply voltage (V_ISO) based on the output pulse signal (C) from the transformer circuit 106. To generate the isolated power supply voltage (V_ISO), the isolated power supply circuit 108 may store energy from the output pulse signal (C) as described further with reference to FIGS. 2A and 2B. The isolated power supply voltage (V_ISO) is isolated from a power supply voltage that may be provided to the first pulse generation circuit 102, the second pulse generation circuit 104, and the input side of the transformer circuit 106. The transformer circuit 106 operates to provide the isolation of the isolated power supply voltage (V_ISO).

In an example embodiment, the latch circuit 110 is configured to generate the isolated PWM signal (PWM_ISO) based on the output pulse signal (C) generated by the transformer circuit 106. As illustrated in FIG. 3, the period of the isolated PWM signal (PWM_ISO) is approximately equal to the period of the input PWM signal (PWM_I). Further, the duty cycle of the isolated PWM signal (PWM_ISO) is also approximately equal to the duty cycle of the input PWM signal (PWM_I). Because the output pulse signal (C) is isolated from the input PWM signal (PWM_I) by the transformer circuit 106, the isolated PWM signal (PWM_ISO) is isolated from the input PWM signal (PWM_I).

By biasing the transformer circuit 106 using the first pulse signal (A) and the second pulse signal (B), the device 100 may consume substantially less power than a device that uses the input PWM signal (PWM_I) to directly bias the transformer circuit 106. The relatively narrow positive and negative pulses of the first pulse signal (A) and the second pulse signal (B) enable use of a relatively smaller transformer in the transformer circuit 106. Use of a smaller transformer results in the device 100 having a smaller size than a device that uses a larger transformer to accommodate direct biasing by the input PWM signal (PWM_I). A smaller transformer in the transformer circuit 106 may also result in the device 100 being relatively inexpensive.

Figure 2A:
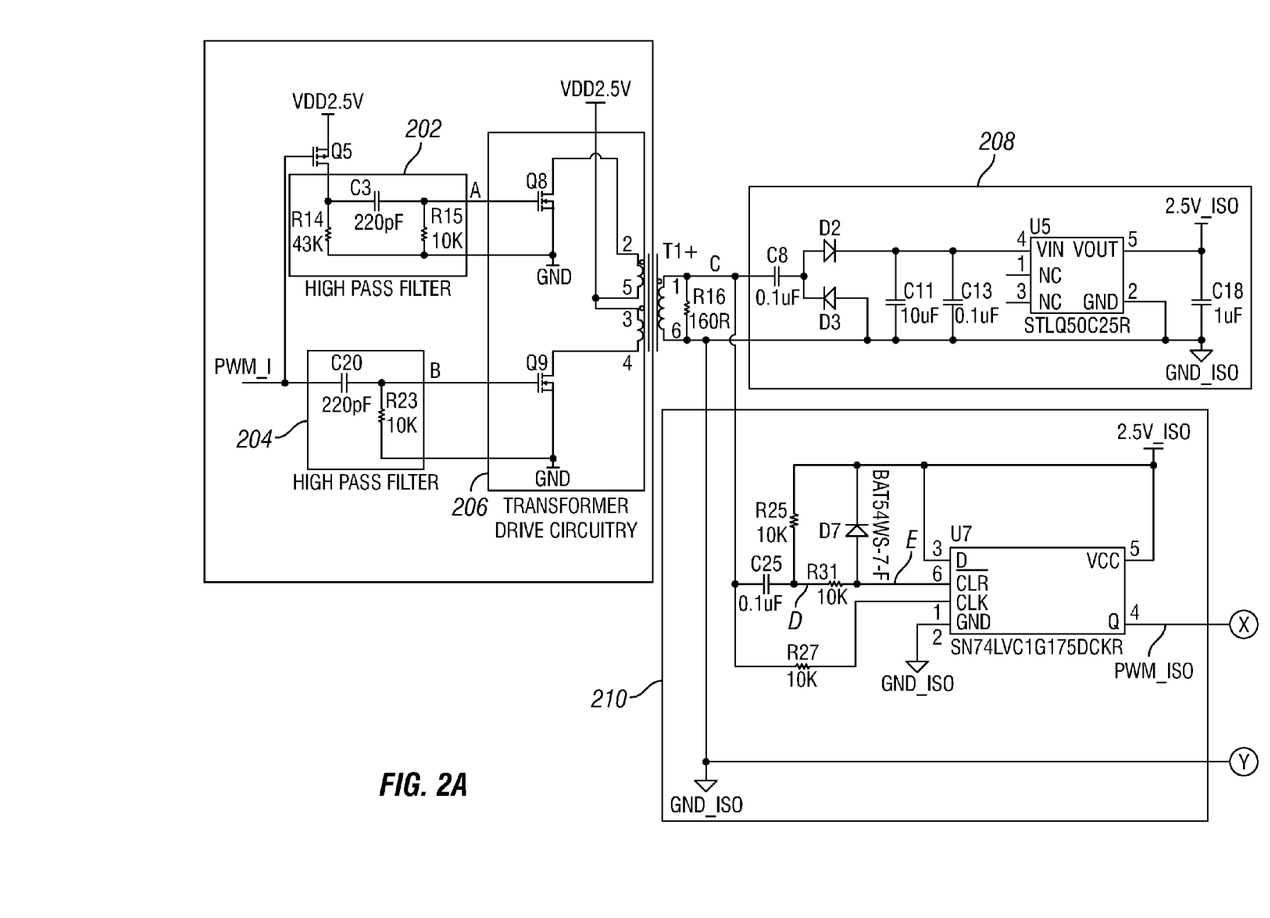
FIGS. 2A and 2B are collectively a diagram of another example embodiment of a device including an isolated power supply with isolated data transfer circuit.
Figure 2B:
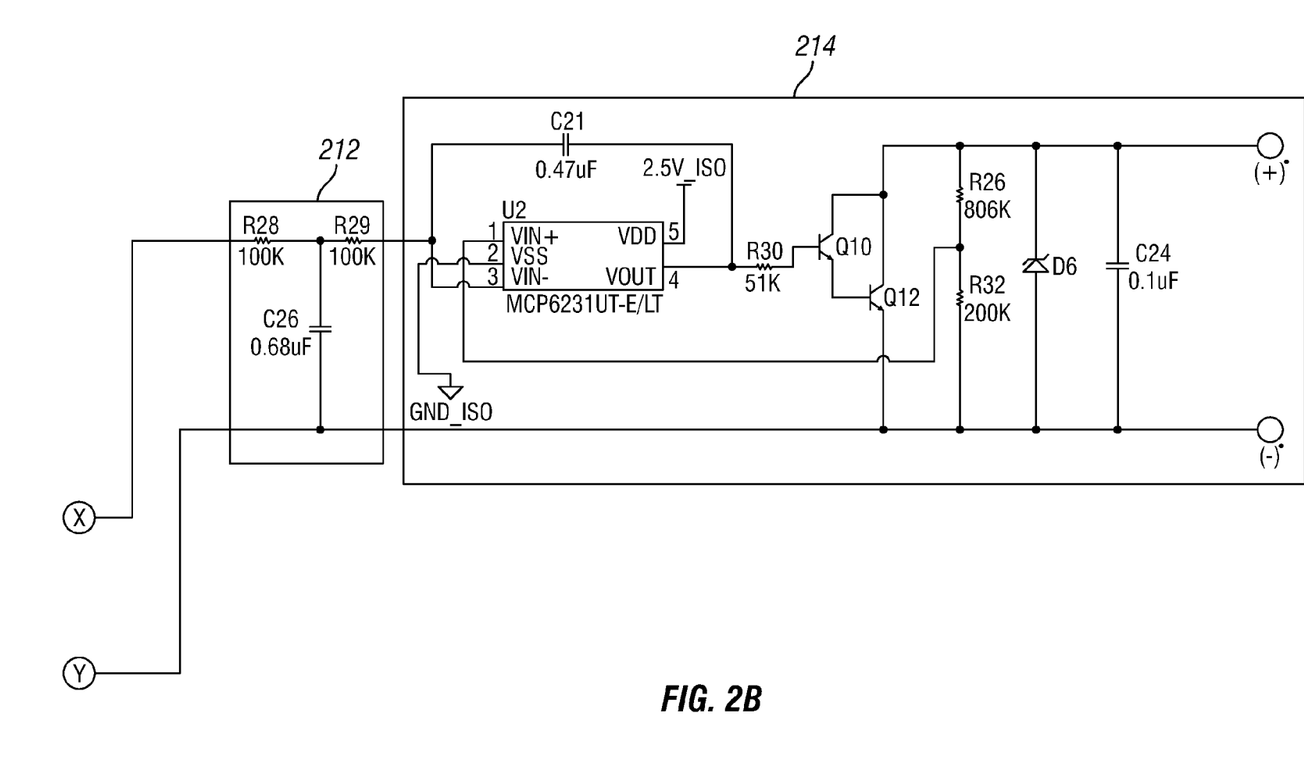

FIGS. 2A and 2B (collectively referred to as "FIG. 2" hereinafter) are collectively a diagram of an example embodiment of a device 200 including an isolated power supply with an isolated data transfer circuit. The device 200 includes a first high pass filter 202, a second high pass filter 204, a transformer T1, transformer drive circuitry 206 including the input side of a transformer T1, an isolated power supply circuit 208, a latch circuit 210, and a low pass circuit (LPF) 212. The device 200 also includes a transistor Q5 and a resistor R16. The transistor Q5 is coupled to the first high pass filter 202. The resistor R16 is coupled to the transformer T1.

When the input PWM signal (PWM_I) transitions from a low voltage level to a high voltage level, a narrow pulse is applied to the transformer T1 in one direction. When the input PWM signal transitions from a high voltage level to a low voltage level, a narrow pulse is applied to the transformer T1 in the opposite direction. To illustrate, the first high pass filter 202 generates the first pulse signal (A) based on the input PWM signal (PWM_I). For example, transistor Q5 may provide an inverted version of the input PWM signal (PWM_I) to the first high pass filter 202. A connection (e.g., a wire) carrying the input PWM signal (PWM_I) is coupled to a gate terminal of the transistor Q5. A first (source) terminal of the transistor Q5 is coupled to a non-isolated power supply, and a second (drain) terminal of the transistor Q5 is coupled to the first high pass filter 202. The high pass filter 202 may receive a signal, which is the inverted version of the input PWM signal (PWM_I), from the second terminal of the transistor Q5 and may generate the first pulse signal (A). The first high pass filter 202 generates the first pulse signal (A) by filtering the inverted version of the input PWM signal (PWM_I).

The first high pass filter 202 may generate positive pulses of the first pulse signal (A) and negative pulses of the first pulse signal (A) based on whether the input PWM signal (PWM_I) transitions from a low voltage level to a high voltage level, or from a high voltage level to a low voltage level. For example, as illustrated in FIG. 3, the negative pulses of the first pulse signal (A) are generated based on a low voltage level to a high voltage level transition of the input PWM signal (PWM_I). The positive pulses of the first pulse signal (A) are generated based on a high voltage level to a low voltage level transition of the input PWM signal (PWM_I). In alternative embodiments, the relationship between the positive and negative pulses of the first pulse signal (A) and transitions of the input PWM signal (PWM_I) may be reversed. The high pulses of the input PWM signal (PWM_I) and the low pulse of the input PWM signal (PWM_I) are each wider than the positive pulses and the negative pulses of the first pulse signal (A).

The second high pass filter 204 generates the second pulse signal (B) based on the input PWM signal (PWM_I). The second high pass filter 204 generates the second pulse signal (B) by filtering the input PWM signal (PWM_I). The second high pass filter 204 may generate positive pulses of the second pulse signal (B) and negative pulses of the second pulse signal (B) based on whether the input PWM signal (PWM_I) transitions from a low voltage level to a high voltage level, or from a high voltage level to a low voltage level. For example, as illustrated in FIG. 3, the positive pulses of the second pulse signal (B) are generated based on a low voltage level to a high voltage level transition of the input PWM signal (PWM_I). The negative pulses of the second pulse signal (B) are generated based on a high voltage level to a low voltage level transition of the input PWM signal (PWM_I). In alternative embodiments, the relationship between the positive and negative pulses of the second pulse signal (B) and transitions of the input PWM signal (PWM_I) may be reversed. The high pulse of the input PWM signal (PWM_I) and the low pulse of the input PWM signal (PWM_I) are each wider than the positive pulses and the negative pulses of the second pulse signal (B).

The transformer drive circuitry 206 receives the first pulse signal (A) and the second pulse signal (B) and drives the transformer T1 to generate the output pulse signal (C) at pin 1 of the transformer T1. The transformer drive circuitry 206 includes a transistor Q8 and a transistor Q9. A first (drain) terminal of the transistor Q8 is coupled to pin 2 of the transformer T1, and a second (source) terminal of the transistor Q8 is coupled to a ground voltage terminal (GND). A gate terminal of the transistor Q8 is coupled to the first high pass filter 202 and receives the first pulse signal (A). A first (drain) terminal of the transistor Q9 is coupled to pin 4 of the transformer T1, and a second (source) terminal of the transistor Q9 is coupled to the ground voltage terminal (GND). A gate terminal of the transistor Q9 is coupled to the second high pass filter 204 and receives the second pulse signal (B). Pin 3 and pin 5 of the transformer T1 are coupled to a non-isolated power supply providing 2.5 volts. Pin 6 is coupled to a ground voltage terminal (GND_ISO) providing a ground connection separate from the ground voltage terminal (GND). A resistor R16 is provided between pin 1 and pin 6 of the transformer T1.

In an example embodiment, when the transistor Q8 is turned on by a positive pulse of the first pulse signal (A), pin 2 of the transformer T1 is pulled to ground voltage level causing the output pulse signal (C) at pin 1 of the transformer T1 to go to a low voltage level (e.g., approximately −2.5 volts). When the transistor Q9 is turned on by a positive pulse of the second pulse signal (B), pin 4 of the transformer T1 is pulled to ground voltage level resulting in the output pulse signal (C) at pin 1 of the transformer T1 going to a high voltage level (e.g., approximately 2.5 volts). When neither of the transistors Q8 and Q9 are turned on, the output pulse signal (C) transitions to or remains at a reference voltage level (e.g., 0 volt).

The transitions of the output pulse signal (C) from the reference voltage level to the high voltage level and back to the reference voltage level based on the first pulse signal (A) and the second pulse signal (B) results in the positive pulses of the output pulse signal (C). Similarly, transitions of the output pulse signal (C) from the reference voltage level to the low voltage level and back to the reference voltage level based on the first pulse signal (A) and the second pulse signal (B) results in the negative pulses of the output pulse signal (C). In a particular embodiment, the positive and negative pulses of the output pulse signal (C) may have pulse widths that are approximately equal to the pulse widths of positive and negative pulses of the first pulse signal (A) and the second pulse signal (B).

In an example embodiment, the isolated power supply circuit 208 may receive the output pulse signal (C) from the transformer T1 and may generate an isolated power supply voltage designated 2.5v_ISO in FIG. 2. For example, the capacitor C11 may store energy from the output pulse signal (C) generated by the transformer T1. The isolated power supply circuit 208 may include a, for example, a voltage regulator U5 to generate the isolated power supply voltage based on the energy stored in the capacitor C11. In the example embodiment of FIG. 2, the voltage regulator U5 is an STMicroelectronics part having a part number STLQ50C25R. In an example embodiment, the isolated power supply circuit 208 may include a voltage doubler, which is implemented using diodes D1 and D2 as illustrated in FIG. 2. Because the output pulse signal (C) is isolated from the non-isolated power supply voltage VDD2.5V by the transformer T1, the isolated power supply voltage (2.5v_ISO) that is generated based on the output pulse signal (C) is also isolated from the non-isolated power supply voltage VDD2.5V. The transformer T1 effectively provides isolation between the isolated power supply voltage 2.5v_ISO and the non-isolated power supply voltage VDD2.5V.

In an example embodiment, the latch circuit 210 may receive the output pulse signal (C) from the transformer T1 and may generate an isolated PWM signal (PWM_ISO). For example, the latch circuit 210 may include a flip-flop U7 (e.g., a D flip-flop). A clock input of the flip-flop U7 is coupled to a connection (e.g., a wire) carrying the output pulse signal (C) from the transformer T1. A second connection (e.g., a wire) carrying the isolated power supply voltage is coupled to a data input of the flip-flop U7. A positive pulse of the output pulse signal (C) at the clock input of the flip-flop U7 may cause the flip-flop U7 to latch in a high logic level corresponding to the voltage level of the isolated power supply voltage (2.5v_ISO) provided to the data input of the flip-flop U7. Latching in the high logic level results in the Q output of the flip-flop U7 going to a high logic level corresponding to the voltage level of the isolated power supply voltage (2.5v_ISO). For example, if the voltage level of the power supply voltage (2.5v_ISO) is approximately 2.5 volts, the Q output of the flip-flop U7 may transition to approximately to 2.5 volts when the flip-flop U7 latches in the 2.5 volts is provided to the data input of the flip-flop U7.

In an example embodiment, a negative pulse of the output pulse signal (C) may pull a clear input of the flip-flop U7 low logic level, which causes the Q output of the flip-flip U7 to go to the low logic level corresponding to the ground voltage level associated with the isolated ground voltage (GND_ISO). The toggling of the Q output of the flip-flop U7 based on the output pulse signal (C) results in the flip-flop U7 generating the isolated PWM signal (PWM_ISO). In an example embodiment, the isolated PWM signal (PWM_ISO) has a period and a duty cycle that are approximately equal to a period and a duty cycle of the input PWM signal (PWM_I), respectively. The generation of the isolated PWM signal (PWM_ISO) that corresponds to the input PWM signal (PWM_I) enables transfer of data from the non-isolated power supply voltage (VDD2.5V) side to the isolated power supply voltage (2.5v_ISO) side.

In some embodiments, the low pass filter 212 may receive the isolated PWM signal (PWM_ISO) and may generate an analog signal by filtering the isolated PWM signal (PWM_ISO). Further, some embodiments may include an output circuit 214 that receives the analog signal from the low pass filter 212. In alternative embodiments, the device 200 may not include one or both of the low pass filter 212 and the output circuit 214.

Characteristics (e.g., period and duty cycle) of the input PWM signal (PWM_I) may be varied in order to vary the isolated PWM signal (PWM_ISO) generated by the latch circuit 210 and to vary the analog signal generated by the low pass filter 212. For a particular period of the input PWM signal (PWM_I), the duty cycle of the input PWM signal may be varied within a range of values for a reliable operation of the device 200. For example, for a particular period of the input PWM signal (PWM_I), a range of duty cycle may be 3% to 97%. For another particular period of the input PWM signal, a range of duty cycle of the input PWM signal may be 10% to 90%. The acceptable range of period and duty cycle of the input PWM signal may depend on factors such as characteristics of the first high pass filter 202 and the second high pass filter 204. Generally, the period and duty cycle of the input PWM signal (PWM_I) may be varied to an extent that the high and low pulses of the first pulse signal (A) and the second pulse signal (B) return to the reference voltage level (e.g., 0 volt) prior to an immediately subsequent transition of the high and low pulses of the input PWM signal (PWM_I).

In an example embodiment, the device 200 may correspond to the device 100 of FIG. 1. The first high pass filter 202 and transistor Q5 may together correspond to the first pulse generation circuit 102 of FIG. 1. Similarly, the second high pass filter may correspond to the second pulse generation signal 104 of FIG. 1. Further, the transformer T1, the transistors Q8 and Q9, and the resistor R16 may together correspond to the transformer circuit 106 of FIG. 1. The isolated power supply circuit 208 may correspond to the isolated power supply circuit 108 of FIG. 1, and the latch circuit 210 may correspond to the latch circuit 110 of FIG. 1.

By biasing the transistors Q8 and Q9 using the first pulse signal (A) and the second pulse signal (B), the device 200 may consume substantially less power than a device that uses the input PWM signal (PWM_I) to bias the transformer T1 or the transistors Q8 and Q9. The relatively narrow positive and negative pulses of the first pulse signal (A) and the second pulse signal (B) enable use of a smaller transformer as transformer T1, which results in the device 200 having a smaller size than a device that uses a larger transformer. The relatively smaller size of the transformer T1 may also result in the device 200 being relatively inexpensive.

Although FIG. 2 illustrates the transistor Q5 as a p-channel metal-oxide-semiconductor (PMOS) transistor, in alternative embodiments, the transistor Q5 may be a re-channel metal-oxide-semiconductor (NMOS) transistor or a different type of transistor (e.g., a bipolar junction transistor) with corresponding changes, such as supply voltage and/or connections. Although FIG. 2 illustrates the transistors Q8 and Q9 as PMOS transistors, in alternative embodiments, the transistors Q8 and Q9 may be a NMOS transistors or a different type of transistors with corresponding changes to supply voltage and/or connections. Further, although the first high pass filter 202 and the second high pass filter 204 are used to generate the first pulse signal (A) and the second pulse signal (B), respectively, in alternative embodiments, other circuits may be used to generate the first pulse signal (A) and the second pulse signal (B) based on the input PWM signal (PWM_I). Further, in alternative embodiments, the latch circuit 210 may include a level-sense latch instead of the flip-flop U7 that is edge sensitive.

Further, particular values of capacitors, resistors, and voltage levels shown in FIG. 2 are example values, and the capacitors, resistors, and voltage levels may have different values without diverging from the scope of this disclosure. Although FIG. 2 shows capacitor C11, in alternative embodiments, multiple capacitors, one or more other capacitive devices, or other energy storage device may be used instead of the capacitor C11. Particular part numbers of components shown in FIG. 2 are example part numbers and may be replaced with other parts that operate in a similar manner.

FIG. 3 is a diagram of signal traces corresponding to signals of the example embodiments of the device 100 of FIG. 1 and the device 200 of FIG. 2. Signal trace PWM_I corresponds to the input PWM signal (PWM_I) of FIGS. 1 and 2. In a particular embodiment, the input PWM signal (PWM_I) may have amplitude of approximately 2.5v and a period of approximately 1000 microsecond corresponding to a frequency of approximately 1 KHz. The high pulses 302 and the low pulses 304 have approximately equal width corresponding to an approximately 50% duty cycle.

Signal trace A corresponds to the first pulse signal (A) as described with reference to FIGS. 1 and 2, and signal trace B corresponds to the second pulse signal (B) as described with reference to FIGS. 1 and 2. In a particular embodiment, the first pulse signal (A) may have positive pulses 306 and negative pulses 308. Similarly, the second pulse signal (B) may have positive pulses 310 and negative pulses 312. The positive pulses 306, 310 and negative pulses 308, 312 each have pulse widths of approximately 2 microseconds, which is substantially smaller than the pulse widths of the high and low pulses of the input PWM signal (PWM_I). Relative to a reference voltage level of 0 volt, the positive pulses 306 of the first pulse signal (A) and the positive pulses 310 of the second pulse signal (B) have amplitudes of approximately 2.5 volts. Relative to the reference voltage level of 0 volt, the negative pulses 308 of the first pulse signal (A) and negative pulses 312 of the second pulse signals (B) have amplitudes of approximately negative 2.5 volts.

Signal trace C corresponds to the output pulse signal (C) of FIGS. 1 and 2. The output pulse signal (C) has positive pulses 314 and negative pulses 316 having pulse widths that are approximately equal to the pulse widths of the positive pulses 306, 310 and the negative pulses 308, 312 of the first pulse signal (A) and second pulse signal (B). Positive pulses 314 of the output pulse signal (C) may have amplitude of approximately 2.5 volts relative to the reference voltage level of 0 volt, and the negative pulses 316 of the output pulse signal (C) may have negative amplitude of approximately negative 2.5 volts relative to the reference voltage level of 0 volt.

Signal trace D corresponds to a signal (D) shown in FIG. 2. The signal (D) has positive pulses that transition from approximately 2.5 volts to approximately 5 volts and back to approximately 2.5 volts. The signal (D) also has negative pulses that transition from approximately 2.5 volts to approximately 0 volt and back to approximately 2.5 volts.

Signal trace E corresponds to a signal (E) shown FIG. 2. The signal (E) has positive pulses that transition from approximately 2.5 volts to approximately 2.8 volts and back to approximately 2.5 volts. The approximately 2.8 volts may include a forward voltage (e.g., 0.3 volt) of a diode D7 shown in FIG. 2. The signal (E) also has negative pulses that transition from approximately 2.5 volts to approximately 0 volt and back to approximately 2.5 volts.

Signal trace PWM_ISO corresponds to the isolated PWM signal (PWM_ISO) generated by the latch circuit 110 of FIG. 1 and the latch circuit 210 of FIG. 2. The isolated PWM signal (PWM_ISO) has a period and a duty cycle that are approximately equal to the period and duty cycle of the input PWM signal (PWM_I), respectively. As illustrated in FIG. 3, the isolated PWM signal (PWM_ISO) has a period of approximately 1000 microseconds and a duty cycle of approximately 50%. The isolated PWM signal (PWM_ISO) also has amplitude of approximately 2.5 volts.

Although FIG. 3 illustrates particular values, such as voltage and pulse width, the values discussed above and shown with respect to FIG. 3 are example values. The device 100 of FIG. 1 and the device 200 of FIG. 2 can operate as described above with different values. For example, the period, duty cycle, and amplitudes of the isolated PWM signal (PWM_ISO) can be higher or lower than the values shown in FIG. 3. Further, FIG. 3 is not intended to show actual signal propagation delays and timing relationships between signals.

Figure 4:
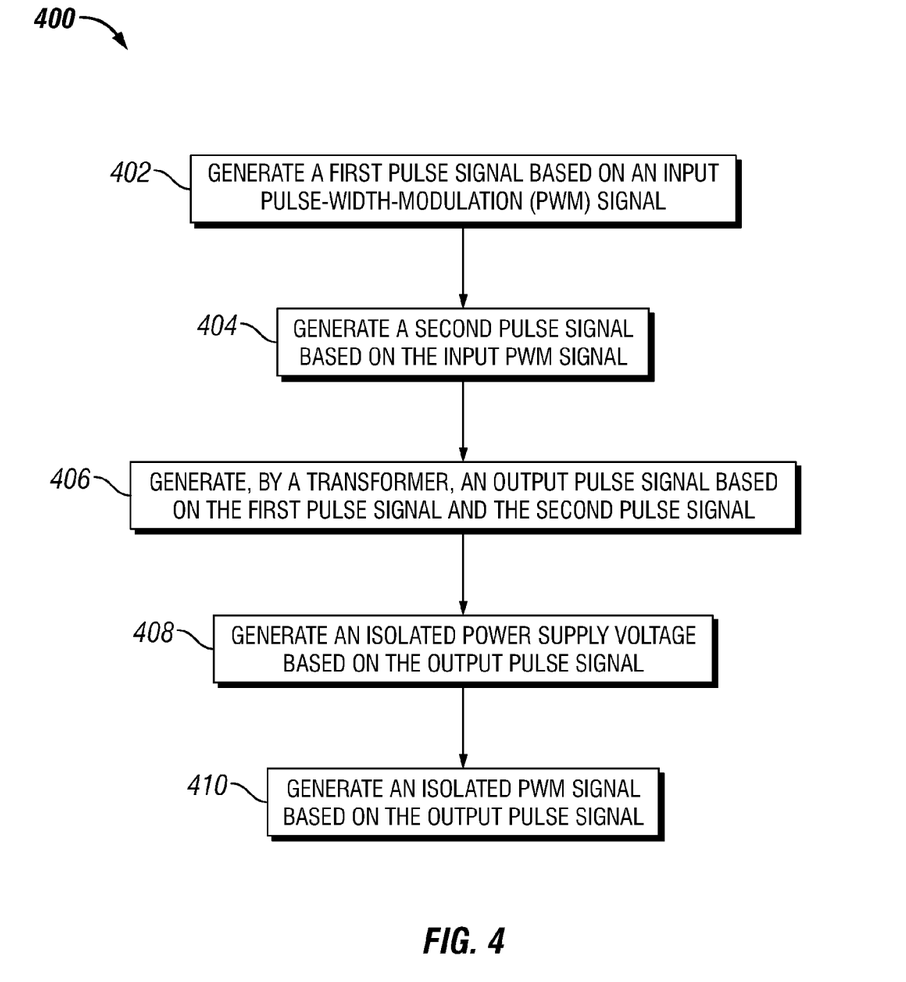
FIG. 4 is a flowchart of an example method of providing an isolated power supply voltage with isolated data transfer.

FIG. 4 is a flowchart of an example method 400 for generating an isolated power supply voltage and an isolated data signal. The method 400 includes generating a first pulse signal based on an input pulse width modulation (PWM) signal, at 402. For example, the first pulse generation circuit 102 of FIG. 1 may generate the first pulse signal (A) that has positive and negative pulses based on the input PWM signal (PWM_I). Similarly, the first high pass filter 202 of FIG. 2 may generate first pulse signal (A) by filtering the input PWM signal (PWM_I). In a particular example embodiment, the first high pass filter 202 of FIG. 2 may generate first pulse signal (A) by filtering an inverted version of the input PWM signal (PWM_I)

The method 400 also includes generating a second pulse signal based on the input PWM signal, at 404. For example, as described above with respect to FIG. 1, the second pulse generation circuit 104 may generate the second pulse signal (B) that has positive and negative pulses based on the input PWM signal (PWM_I). Similarly, the second high pass filter 204 of FIG. 2 may generate the second pulse signal (B) by filtering the input PWM signal (PWM_I).

At 406, a transformer may generate an output pulse signal based on the first pulse signal generated at 402 and the second pulse signal generated at 404. For example, the transformer circuit 106 of FIG. 1, which includes a transformer, may generate the output pulse signal (C) that has positive and negative pulses as described with respect to FIG. 1. Similarly, the transformer circuit T1 of FIG. 2 may generate the output pulse signal (C) as described with respect to FIG. 2.

The method 400 also includes generating an isolated power supply voltage based on the output pulse signal, at 408. As described above, the isolated power supply circuit 108 of FIG. 1 and the isolated power supply circuit 208 of FIG. 2 generate the isolated power supply voltage. For example, the isolated power supply voltage (V_ISO) is generated by the isolated power supply circuit 108. Similarly, the isolated power supply voltage (2.5v_ISO) is generated by the isolated power supply circuit 208 of FIG. 2.

At 410, an isolated PWM signal is generated based on the output pulse signal. For example, a period of the isolated PWM signal may be approximately equal to a period of the input PWM signal. Further, a duty cycle of the isolated PWM signal may be approximately equal to a duty cycle of the input PWM signal. In an example embodiment, the isolated PWM signal may be filtered by a low pass filter circuit to generate an analog signal.

Although particular embodiments have been described herein in detail, the descriptions are by way of example. The features of the embodiments described herein are representative and, in alternative embodiments, certain features, elements, and/or steps may be added or omitted. Additionally, modifications to aspects of the embodiments described herein may be made by those skilled in the art without departing from the spirit and scope of the following claims, the scope of which are to be accorded the broadest interpretation so as to encompass modifications and equivalent structures.

What is claimed is:

1. An apparatus for generating an isolated power supply voltage and an isolated data signal, the apparatus comprising:
    a first pulse generation circuit configured to generate a first pulse signal based on an input pulse width modulation (PWM) signal;
    a second pulse generation circuit configured to generate a second pulse signal based on the input PWM signal;
    a transformer circuit comprising a transformer and coupled to the first pulse generation circuit and to the second pulse generation circuit, wherein the transformer is configured to generate an output pulse signal based on the first pulse signal and the second pulse signal;
    an isolated power supply circuit coupled to the transformer circuit and configured to generate an isolated power supply voltage based on the output pulse signal; and
    a latch circuit coupled to the transformer circuit, the latch circuit configured to generate an isolated PWM signal based on the output pulse signal.

2. The apparatus of claim 1, wherein a period of the output PWM signal is approximately equal to a period of the input PWM signal and wherein a duty cycle of the isolated PWM signal is approximately equal to a duty cycle of the input PWM signal.

3. The apparatus of claim 1, wherein the first pulse signal includes a first positive pulse and a first negative pulse, wherein the second pulse signal includes a second positive pulse and a second negative pulse, wherein the output pulse signal includes a third positive pulse and a third negative pulse, and wherein the first positive pulse, the first negative pulse, the second positive pulse, the second negative pulse, the third positive pulse, and the third negative pulse have approximately equal pulse widths.

4. The apparatus of claim 3, wherein a high pulse of the input PWM signal and a low pulse of the input PWM signal are each wider than each of the first positive pulse, the first negative pulse, the second positive pulse, and the second negative pulse.

5. The apparatus of claim 1, wherein the transformer circuit comprises a first transistor and a second transistor, wherein the first transistor and the second transistor are coupled to the transformer, wherein a gate terminal of the first transistor is coupled to a first connection carrying the first pulse signal, and wherein a gate terminal of the second transistor is coupled to a second connection carrying the second pulse signal.

6. The apparatus of claim 1, further comprising a capacitive device, the capacitive device configured to store energy from the output pulse signal, wherein the isolated power supply circuit is configured generate the isolated power supply voltage based on the energy stored in a capacitive device.

7. The apparatus of claim 1, wherein the latch circuit comprises a flip-flop having a clock input coupled to a connection carrying the output pulse signal and wherein the flip-flop is configured to generate the isolated PWM signal.

8. The apparatus of claim 1, further comprising a low pass filter circuit coupled to the latch circuit and configured to generate an analog signal based on the isolated PWM signal.

9. An apparatus for generating an isolated power supply voltage and an isolated data signal, the apparatus comprising:
a first high pass filter circuit configured to generate a first pulse signal based on an input pulse-width-modulation (PWM) signal;
a second high pass filter circuit configured to generate a second pulse signal based on the input PWM signal;
a transformer configured to generate an output pulse signal based on the first pulse signal and the second pulse signal;
an isolated power supply circuit coupled to the transformer and configured to generate an isolated power supply voltage based on the output pulse signal; and
a latch circuit coupled to the transformer and configured to generate an isolated PWM signal based on the output pulse signal.

10. The apparatus of claim 9, wherein the first high pass filter circuit is configured to generate the first pulse signal based on an inverted PWM signal, wherein the input PWM signal and the inverted PWM signal are inversions of each other.

11. The apparatus of claim 9, wherein a period of the isolated PWM signal is approximately equal to a period of the input PWM signal and wherein a duty cycle of the isolated PWM signal is approximately equal to a duty cycle of the input PWM signal.

12. The apparatus of claim 9, wherein the first pulse signal includes a first positive pulse and a first negative pulse, wherein the second pulse signal includes a second positive pulse and a second negative pulse, wherein the output pulse signal includes a third positive pulse and a third negative pulse, and wherein a high pulse of the input PWM signal and a low pulse of the input PWM signal are each wider than each of the first positive pulse, the first negative pulse, the second positive pulse, and the second negative pulse.

13. The apparatus of claim 9, further comprising a first transistor and a second transistor, wherein the first transistor is coupled to an output of the first high pass filter and to a first terminal of the transformer and wherein the second transistor is coupled to an output of the second high pass filter and to a second terminal of the transformer.

14. The apparatus of claim 9, wherein the latch circuit comprises a flip-flop having a clock input coupled to a connection carrying the output pulse signal and wherein the flip-flop is configured to generate the isolated PWM signal.

15. The apparatus of claim 14, wherein the isolated power supply circuit is configured to provide the isolated power supply voltage on a second connection that is coupled to a data input of the flip-flop.

16. A method of generating an isolated power supply voltage and an isolated data signal, the method comprising:
generating a first pulse signal based on an input pulse-width-modulation (PWM) signal;
generating a second pulse signal based on the input PWM signal;
generating, by a transformer, an output pulse signal based on the first pulse signal and the second pulse signal;
generating an isolated power supply voltage based on the output pulse signal; and
generating an isolated PWM signal based on the output pulse signal.

17. The method of claim 16, further comprising generating an inverted PWM signal from the input PWM signal, wherein the generating the first pulse signal comprises filtering the inverted PWM signal by a high pass filter.

18. The method of claim 16, wherein a period of the isolated PWM signal is approximately equal to a period of the input PWM signal and wherein a duty cycle of the isolated PWM signal is approximately equal to a duty cycle of the input PWM signal.

19. The method of claim 16, wherein the first pulse signal includes a first positive pulse and a first negative pulse, wherein the second pulse signal includes a second positive pulse and a second negative pulse, wherein the output pulse signal includes a third positive pulse and a third negative pulse, and wherein a high pulse of the input PWM signal and a low pulse of the input PWM signal are each wider than each of the first positive pulse, the first negative pulse, the second positive pulse, and the second negative pulse.

20. The method of claim 19, wherein the first negative pulse and the second positive pulse are generated based on a low voltage level to a high voltage level transition of the input PWM signal and wherein the first positive pulse and the second negative pulse are generated based on a high voltage level to a low voltage level transition of the input PWM signal.

* * * * *